UNITED STATES PATENT OFFICE.

MEILICH MELAMID, OF FREIBURG, GERMANY.

PROCESS OF PRODUCING PURE RESIN-OILS.

1,133,994.   Specification of Letters Patent.   Patented Mar. 30, 1915.

No Drawing.   Application filed August 4, 1914.   Serial No. 855,050.

*To all whom it may concern:*

Be it known that I, MEILICH MELAMID, a subject of the Czar of Russia, and residing at Freiburg, in the Grand Duchy of Baden, Germany, have invented a certain new and useful Process of Producing Pure Resin-Oils, of which the following is a specification, this application being a division in part of copending application, Serial No. 772,838, filed June 10, 1913, this latter application being a divisional application of my application for Letters Patent, Serial No. 732,141, filed November 18, 1912.

In a former application, Serial No. 772838, I have described a process of purifying resin oils by heating resin with phosphoric acid to a high temperature. I have now discovered that pure resin oils can also be obtained, when instead of phosphoric acid other phosphorus compounds are employed, for instance: pyro-phosphoric acid, meta-phosphoric acid, phosphorus-pentoxid ($P_2O_5$) or phosphorous acid or a mixture of several or all of these compounds. I have further discovered, that with these phosphorous compounds it is possible to operate at a lower temperature of for instance 150–200° C.

The process is performed in the following manner:

Example: 1000 kg. resin are heated with 25 kg. of a phosphorous-oxygen compound, not phosphoric-acid, as for instance phosphorous pentoxid, or: 1000 kg. resin are heated with 20 kg. of a phosphorus-oxygen compound, not phosphoric-acid and with 15 kg. of another phosphorus-oxygen compound not phosphoric-acid.

According to the present process from resins approximately 20% turpentine-oil substitute are obtained, while the remainder is clear, odorless resin oil.

Instead of applying the process to resin, it can also be applied to resin distillates, which can always be further purified by this process. Accordingly the distillates, obtained by the heating of resin only or by the heating of resin with one or more phosphorus-oxygen compounds, for instance: pyro-phosphoric acid, meta-phosphoric acid, phosphorus-pentoxid, or phosphorous acid or of mixtures of these compounds, can be treated with pyro-phosphoric acid, meta-phosphoric acid, phosphorus-pentoxid or phosphorus acid or with mixtures of these compounds.

What I claim as new and desire to secure by Letters Patent of the United States is:

1. The process of producing pure resin oils, consisting in heating resin with a phosphorus-oxygen compound other than phosphoric acid, substantially as described.

2. The process of producing pure resin oils, consisting in mixing resin with a phosphorus-oxygen compound other than phosphoric acid and heating the mixture, substantially as described.

3. The process of producing pure resin oils, consisting in heating resin with a mixture of phosphorus-oxygen compounds, not containing phosphoric acid, substantially as described.

4. The process of producing pure resin oils, consisting in treating resin with a phosphorus-oxygen compound other than phosphoric acid and heating the mixture to a low temperature, substantially as described.

5. The process of producing pure resin oils, consisting in treating resin with a phosphorus-oxygen compound other than phosphoric acid and heating the mixture to approximately 150–200° C, substantially as described.

6. The process of producing pure resin oils, consisting in treating resin with several phosphorus-oxygen compounds other than phosphoric acid and heating the mixture to approximately 150–200° C, substantially as described.

7. The process of producing pure resin oils, consisting in treating resin with phosphorus-pentoxid and heating the mixture, substantially as described.

8. The process of producing pure resin oils, consisting in melting resin, adding thereto a phosphorus-oxygen compound other than phosphoric acid and heating the mixture, substantially as described.

9. The process of producing pure resin oils, consisting in melting resin, adding thereto several phosphorus-oxygen compounds other than phosphoric acid and heating the mixture, substantially as described.

10. The process of producing pure resin oils, consisting in melting resin, adding thereto a phosphorus-oxygen compound other than phosphoric acid and heating the mixture to approximately 150–200° C, substantially as described.

11. The process of producing pure resin oils, consisting in melting resin, adding thereto several phosphorus-oxygen compound other than phosphoric acid and heating the mixture to approximately 150–200° C, substantially as described.

12. The process of producing pure resin oils, consisting in heating a phosphorus-oxygen compound other than phosphoric acid and treating this heated compound with liquefied resin, substantially as described.

13. The process of producing pure resin oils, consisting in heating a mixture of phosphorus-oxygen compounds other than phosphoric acid and treating this mixture of heated compounds with liquefied resin, substantially as described.

In testimony whereof I affix my signature in the presence of two witnesses.

Dr. MEILICH MELAMID.

Witnesses:
 GEORG REUTEBMH,
 T. B. ZWICK.